July 12, 1955 J. T. NEISWINTER 2,713,087

FULL DUPLEX TELEGRAPH REPEATER CIRCUIT

Filed June 21, 1951

INVENTOR
J. T. NEISWINTER
BY John E. Cassidy
ATTORNEY 2,713,087

FULL DUPLEX TELEGRAPH REPEATER CIRCUIT

James T. Neiswinter, Garden City, N. Y., assignor to American Telephone and Telegraph Company, a corporation of New York Application June 21, 1951, Serial No. 232,799
5 Claims. (Cl. 178—73)

Figure 1:
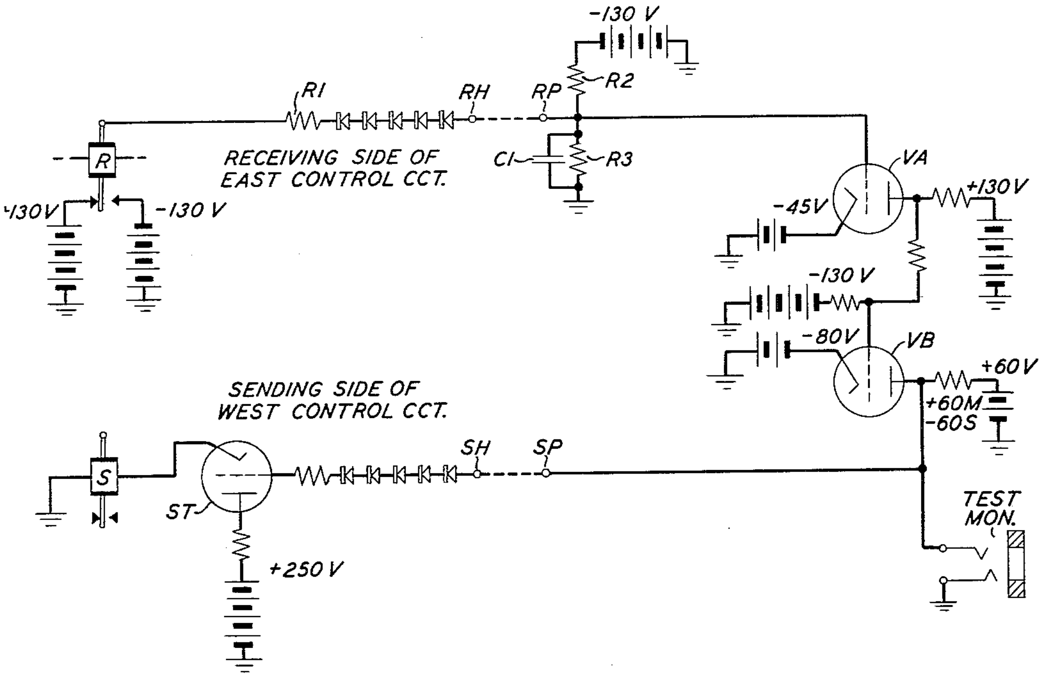

This invention is an improved telegraph repeater circuit of the hub type.

Reference is made to the patent application of W. T. Rea, Serial No. 130,267, filed November 30, 1949, now Patent No. 2,607,852, which discloses a circuit to which the present invention may be applied and which is hereby made part of the present application as though fully set forth herein.

Hub type telegraph repeaters are well known in the art. They are ordinarily employed in half-duplex concentrations and afford means whereby any one of a number of telegraph circuits, from three to ten or more, may transmit to all of the others simultaneously. Only one may transmit effectively at any one time.

In one large telegraph system all of the telegraph circuits, both lines and loops connected through a particular kind of board, known as a telegraph service board, have been equipped with arrangements which permit them to be connected into half-duplex hub telegraph concentration groups. These circuits may be required at times to function in full-duplex, rather than in half-duplex operation. In order to permit any circuit connected to the board to serve at times in a half-duplex telegraph hub concentration, each telegraph line circuit and each telegraph loop circuit, which may be connected into a concentration, is equipped with what is known in the art as a hub coupling unit, formerly known as a hub control circuit, which regulates transmission in the telegraph line or in the telegraph loop and the primary function of which is to prevent retransmission of telegraph signals incoming to the hub from a particular line or loop back over the same line or loop from which it originated, which would mutilate the incoming signals.

Any two telegraph line circuits connected to the telegraph service board may be required to serve in a full-duplex arrangement. Each of the circuits has an individual receiving leg and an individual sending leg and each circuit has an individual coupling unit. In a full-duplex arrangement only two circuits are interconnected. The sending leg of one is connected to the receiving leg of the other and vice versa. Signals incoming from the receiving leg of one circuit pass through certain of the elements of the coupling unit connected to the circuit and appear at the point which would correspond to the receiving hub RH in the usual half-duplex concentration.

A coupling unit is controlled by potentials appearing on the receiving hub and on its connected receiving leg. Ordinarily, when any other circuit connected into a half-duplex concentration group is transmitting toward the hub, the coupling unit will maintain the sending leg of the individual repeater it is serving, in condition so that the signals may pass through its sending leg. When signals are being transmitted through the receiving leg of a particular repeater, say repeater one, toward the receiving hub, the coupling unit serving repeater one locks the sending leg of repeater one so that signals may not be retransmitted back to their source which would mutilate the signals.

At times two repeaters attempt to transmit message signals through a half-duplex hub concentration simultaneously. This cannot be done effectively. When this is attempted the hub repeater and control circuits are arranged to produce a characteristic voltage condition on the receiving hub which serves to control each individual coupling circuit in a manner to unlock each associated sending leg. As a result of this the mutilated signals produced on the hub, due to the attempted simultaneous sending, are transmitted to each station in the system including those simultaneously sending as an indication of the abnormal condition.

Full-duplex operation through two circuits each equipped with its own individual coupling unit is achieved by producing at each of the two points corresponding to the single hub of a half-duplex concentration a potential characteristic of the abnormal or double-space condition. If one circuit alone transmits, the sending leg of the other is unlocked and the signal passes freely through the opposite sending leg. If, say the east station, is transmitting through the east receiving leg and the east receiving hub to the west sending hub and west sending leg to the west station, as the signal passes through the east receiving hub it will produce a double-space voltage condition in its associated control unit which unlocks its own east sending leg. If a signal at the time is incoming over the west receiving leg through the west receiving hub, through the east sending hub and the east sending leg to the east station, it can, therefore, pass through the unlocked east sending leg. Transmission in the opposite direction is effected similarly. The full-duplex operation, as should be apparent from the foregoing, depends on the interconnection of two circuits only, through two sets of hubs rather than one and the production on the receiving hub of a potential characteristic of the double-space condition in half-duplex concentrations when a signal is received over the connected receiving leg.

In order to produce, in full-duplex operation, for a single space, a potential characteristic of the double-space condition in half-duplex operation, it has been proposed to employ two different potentiometers connected to the receiving hub, one for half-duplex operation and another for full-duplex operation. It has been found, however, that this does not afford satisfactory operation under certain conditions when the capacity of the circuits connected to the receiving hub is high.

The present invention is intended to correct the foregoing difficulty and may be understood from the following description when read with reference to the associated drawing which taken together disclose an embodiment in which the invention is presently incorporated although it is to be understood that it is capable of other embodiments.

In the two figures shown on the drawing, Fig. 1 discloses the circuit of the invention.

Figure 2:
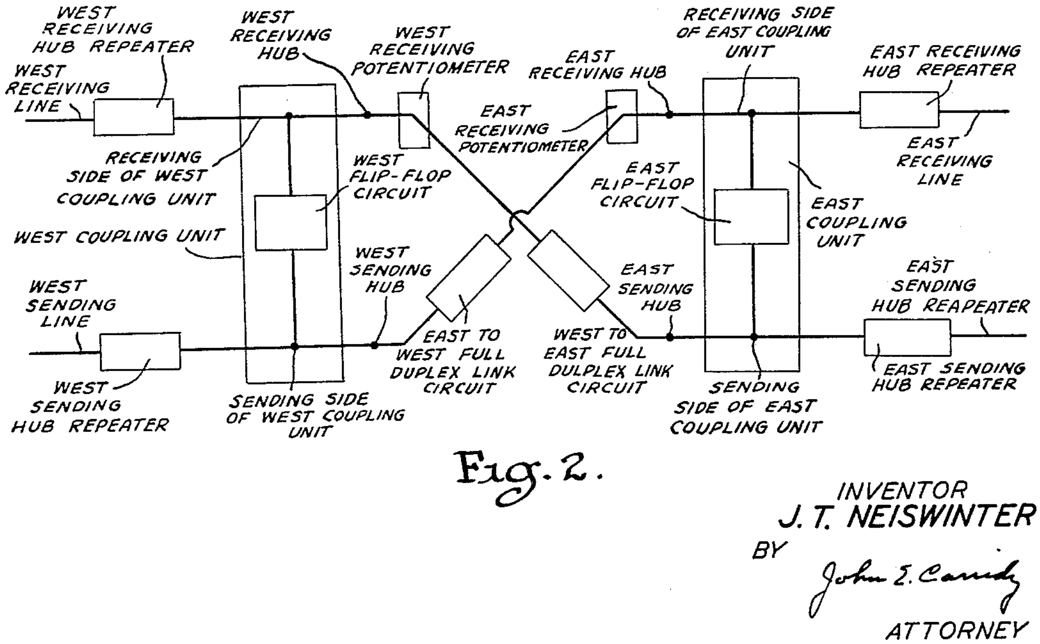

Fig. 2 is a diagram used in explaining the invention.

Refer now to Fig. 2 which shows, by means of captioned rectangles a full-duplex telegraph system consisting of two lines interconnected by hub repeaters and coupling units and two full-duplex links. The two circuits are shown arranged for full-duplex transmission. In full-duplex transmission only two circuits may be interconnected and two full-duplex hub links are required. The telegraph communication signals may pass in each direction between the two circuits simultaneously. The two circuits are each arranged so that when they are disconnected from the full duplex arrangement they may be interconnected in a grouping of a larger number of circuits to form a half-duplex hub circuit in which only one hub link is required. When a half-duplex group is to be formed the two special full-duplex potentiometers and full-duplex link circuits interconnecting the two-circuit full-duplex arrangement are disconnected and the two circuits are joined to other circuits at their respective receiving and sending hub points which are then interconnected by a single hub. In the half duplex arrangement only one of the circuits so joined may transmit effectively at any one time and the signals are received by all of the circuits except the one which is sending.

In the two-circuit full-duplex arrangement, shown in Fig. 2, in transmitting from west to east signals came in over the west receiving line through the west receiving hub repeater and pass through the receiving branch of the west coupling unit to the west receiving hub. They then pass through the west receiving potentiometer and through the west to east full-duplex link circuit of the present invention, through the east sending hub, the sending leg of the east coupling unit and the east sending hub repeater to the east sending line. In transmitting from east to west the signals pass through a corresponding path. The paths are completely separate except for the fact that the west receiving branch and the west sending branch are interconnected through control elements comprising the so-called flip-flop circuit in the west coupling unit and the east receiving branch and the east sending branch are similarly interconnected.

In half-duplex hub concentrations as is well known, and explained in the Rea patent cited in the foregoing, each individual circuit has a coupling unit and it performs two main functions as follows: When signals are being received and impressed on the hub through the receiving leg of a single particular repeater, its associated sending leg is locked to prevent sending the signals back to their source and the consequent mutilation of the signals being transmitted. If more than one repeater of a half-duplex concentration group attempt to transmit simultaneously, which cannot be done effectively through the single half-duplex hub, the coupling unit in each circuit unlocks its associated sending leg. All such legs are unlocked and the mutilated signals produced on the hub by the attempted simultaneous sending are reflected back to all stations connected into the concentration. The reception of the mutilated signals at the two or more stations sending simultaneously serves as an indication of the condition. The coupling units in each repeater are controlled in performing these two functions by distinctive potentials produced on the single receiving hub of a half-duplex concentration in response to the imposition thereon of a single spacing signal element and in response to the imposition thereon of more than one spacing signal element simultaneously.

In the full-duplex arrangement, described herein, there are two individual receiving hubs and they are not interconnected. The receiving hub of each circuit is connected to the sending hub of the opposite circuit through the individual full-duplex link circuit of the present invention. Two such links are required for each full-duplex interconnection. There is only one spacing signal potential produced on each receiving hub as only one is possible as only one receiving branch is connected to each hub. The potential which is produced in response to the reception by either of the receiving hubs of a spacing signal from its respective connected receiving leg corresponds to that produced on the receiving hub of a half-duplex concentration group when two circuits attempt to transmit simultaneously. The coupling unit interconnecting the sending and receiving legs on the east side, for instance, of the full-duplex connection, in response to a spacing signal incoming over the east receiving leg, instead of locking its east sending leg, as it would do if it were functioning in a half-duplex concentration and the east receiving leg were the only one transmitting toward the hub, in which case the single space potential would be produced on the hub, now unlocks the sending leg of the east repeater. This is because, in the full-duplex arrangement, the potential which is produced on the individual east receiving hub associated with the east receiving leg, in response to the reception of a single spacing signal element therefrom, is the same in magnitude and polarity as is produced in half-duplex concentrations in response to the reception of two spacing signal elements simultaneously. That is to say the double space half-duplex potential is produced in response to a single space condition in the full-duplex arrangement.

The object in doing this is to permit a spacing signal element to pass if one is simultaneously being transmitted from the opposite circuit. If no signals are being transmitted from the opposite circuit simultaneously, the unlocking of its associated east sending leg, when signals are being received by the east receiving circuit, is without avail. But since, in half-duplex hub operation, the sending leg of a hub repeater is locked while signals are being received through its associated receiving leg, if it is the only receiving leg transmitting toward the hub, and the coupling units are the same for both half-duplex and full-duplex service and respond in the same manner when the applied potentials are the same, if the sending leg were locked in response to a signal passing through its associated receiving leg, a signal incoming simultaneously over the receiving leg of the west repeater would be blocked and could not pass through the sending leg of the east repeater. So in response to an incoming signal from either receiving leg of a full-duplex arrangement the potential characteristic of the simultaneous reception of two spacing signal elements in a half-duplex concentration group is produced on the corresponding receiving hub so as to unlock the coupling unit interconnecting the receiving leg to the corresponding sending leg. The effect is that neither sending leg is ever locked in a full-duplex hub repeater system and signals are free to pass from the receiving leg of either repeater to the sending leg of the opposite repeater.

Where the magnitudes of constants, such as the magnitudes of potentials, are cited in the following it is to be understood that the values cited are by way of example as an aid in understanding the invention but the operation of the invention is not limited to the cited values.

Refer now to Fig. 1 which discloses a space discharge hub potentiometer employing two vacuum tube triodes which is to be employed in place of the usual resistance type potentiometer or resistances combined with metal oxide rectifiers. Attention is called to the fact that in Fig. 1 the receiving side of the east control circuit is shown extending from the left toward the hub whereas in Fig. 2 it is shown extending from the right toward the hub.

The drawing shows a receiving relay R, the armature of which is actuated between its marking and spacing contacts in response to signals impressed on the relay to impress positive and negative battery of say 130 volts each, through resistor R1 and a plurality, such as five, metal oxide rectifiers on the receiving hub RH. The receiving hub RH is connected to a terminal of the receiving potentiometer at the junction between resistors R2 and R3, the outer terminals of which are connected between negative battery and ground. Resistor R3 is shunted by capacitance C1. Connected to the junction point of the receiving potentiometer in a branch corresponding to the hub link in a half-duplex hub, that is the link connecting the receiving hub RH and the sending hub SH, are two vacuum tube triodes VA and VB. The grid of VA is connected to the receiving hub RH and the junction between the resistors of the hub potentiometer. The anode of VA is connected to the grid of VB and the anode of VB is connected to terminal SP and to the sending hub SH which connects through a plurality of dry rectifiers to the grid of sending triode ST, the output circuit of which is connected to the winding of the sending relay S.

In the case of the potentiometer heretofore employed to perform the full-duplex functions described in the foregoing, two resistances only were employed. The marking voltage produced on the hub was positive 60 volts. The spacing voltage was negative 60 volts. This negative 60 volts corresponded to the double-space voltage produced in a half-duplex concentration group when the potentiometer employed in such service was used. This negative 60 volts causes the flip-flop circuit in the coupling unit to operate to a position which does not block the sending side of the circuit.

Under this condition transmission on the sending side of the circuit will not be affected by transmission on the receiving side of the circuit, since during the existence of a spacing signal on the receiving side which would normally cause the sending side of the circuit to be blocked so that the space could not return to the sender (half-duplex operation) the voltage on the hub is that of a double space, and the flip-flop circuit does not operate to the blocking position.

At the conclusion of a space, or what in this case is effectively a double space, the flip-flop circuit will normally remain as it is and the sending side of the circuit accordingly will remain unblocked.

Because of a modification applied to the control circuit to make it operate satisfactorily on half-duplex operation, when the capacity of the office cabling containing the SH and RH leads is high, it was found that on full-duplex operation, on a space-to-mark transition on the RH lead the voltage on the hub potentiometer, in changing from negative 60 volts to positive 60 volts reached the positive 60 volts ahead of the changing voltage on the cathode of one of the triodes of the flip-flop circuit and caused this tube to conduct and operate the flip-flop circuit to the other position. This caused the sending side of the control circuit to become blocked. The vacuum tube hub potentiometer circuit proposed herein operates on the basis that the potential on the part of the potentiometer to which the RH lead is connected is negative 30 volts for the marking condition instead of positive 60 volts and remains negative 60 volts for the spacing condition. Under this arrangement the receiving hub RH never gets positive enough to operate the flip-flop circuit to its holding position so a hold is never applied to the sending leg.

In the drawing the RH lead of the control circuit is shown connected to the junction of 1600-ohm resistor R3 and 5300-ohm resistor R2 of the receiving hub potentiometer RP. These values are such that when the receiving side of the control circuit is marking the voltage at the mid-point of the potentiometer is negative 30 volts and when the receiving side is spacing the potential is negative 60 volts.

The negative 30 volts for the marking condition is so different from the normal positive 60 volts that in order to permit certain testing and other functions to be performed it is necessary to convert this negative 30-volt potential to the normal marking voltage of positive 60 volts employed in the associated switchboard since the circuits designed to perform these tests are arranged to cooperate with hub circuits of this voltage and the half-duplex circuits are more numerous.

The conversion of the voltage is accomplished by two triodes VA and VB. On these two triodes the required potentials are produced by a proper choice of resistances and potentials in the output and coupling circuits.

In the output circuit of triode VB, therefore, the potentials obtained may be for instance positive 60 volts for marking and negative 60 volts for spacing which correspond to the marking and double space potentials for half-duplex hub telegraph repeater concentration groups. A tap is taken off at this point and extended to the testing and monitoring jack TEST MON at the switchboard, which permits testing and monitoring with the same testing and monitoring circuits as employed for half-duplex concentrations.

A duplicate arrangement, not shown in Fig. 1, but indicated diagrammatically in Fig. 2, would be used for transmission from the RH lead of the west control circuit to the SH lead of the east control circuit as should be apparent from the foregoing.

What is claimed is:

1. A full-duplex hub telegraph repeater system having instrumentalities therein for repeating changes in potential defining telegraph signal elements, said system having a first telegraph line repeater, said line repeater having a receiving leg, a second telegraph line repeater, said second repeater having a sending leg, a full-duplex telegraph hub link, said link interconnecting said leg; said link comprising a potentiometer connected directly to said receiving leg and a space discharge device having an input circuit connected directly to said potentiometer and an output circuit connected in said link.

2. A full-duplex hub telegraph repeater system having a first and a second hub type repeater, each repeater having a receiving leg and a sending leg, a first and a second full-duplex link circuit interconnecting said receiving legs of said first and said second repeaters to said sending legs of said second and first repeaters respectively individually and a space discharge device in each of said link circuits responsive to changes in potential impressed thereon defining telegraph signal elements, said devices having output circuit means for substantially modifying said changes in potential.

3. A full-duplex hub telegraph repeater system having a first and a second hub telegraph repeater, each of said repeaters having an individual telegraph receiving leg connected to an individual receiving hub and an individual telegraph sending leg connected to an individual sending hub, a first and a second hub link interconnecting said receiving hub of said first repeater to said sending hub of said second repeater and said receiving hub of said second repeater to said sending hub of said first repeater, respectively, a first and a second space discharge device in each of said links, said first device having a grid connected directly to its respective receiving hub, said second device having an anode connected directly to its respective sending hub and coupling between an anode of said first device and a grid of said second device in each of said links.

4. A full-duplex hub telegraph repeater system, a first telegraph repeater therein, said repeater having a receiving leg connected to a first receiving hub and a sending leg connected to a first sending hub, a second telegraph repeater having a receiving leg connected to a second receiving hub and a sending leg connected to a second sending hub, an individual hub link connecting said first receiving hub to said second sending hub and said second receiving hub to said first sending hub, respectively, a first and a second space discharge device connected in each said hub link, the input of said first device connected to its respective receiving hub, the output of said second device connected to its respective sending hub and the output of said first device connected to the input of said second device in its respective link.

5. A full-duplex hub telegraph repeater system having a first and a second hub type telegraph repeater, each of said repeaters having an individual receiving hub and an individual sending hub, an individual hub link interconnecting said receiving hub of said first repeater to said sending hub of said second repeater and said receiving hub of said second repeater to said sending hub of said first repeater, a space discharge device in each said link, said device having an input circuit on which are impressed through said link, changes in potential defining telegraph signal elements, said device having an output circuit including means for modifying said potentials so as to make them suitable for cooperation with monitoring circuits and a conductor extending from said output circuit in each said link to a switchboard for monitoring.

References Cited in the file of this patent

UNITED STATES PATENTS

| | | |
|---|---|---|
| 2,345,953 | Tolen | Apr. 4, 1944 |
| 2,347,813 | Cummings | May 2, 1944 |
| 2,352,272 | Large et al. | June 27, 1944 |
| 2,528,120 | Davey | Oct. 31, 1950 |
| 2,558,197 | Rea | June 26, 1951 |